(12) United States Patent
Provost et al.

(10) Patent No.: US 11,292,554 B2
(45) Date of Patent: *Apr. 5, 2022

(54) VELOCIPEDE HAVING SPLIT DRIVE TRAIN

(71) Applicant: CR Design & Development, LLC, Deerfield Beach, FL (US)

(72) Inventors: Robert Joseph Provost, Parkland, FL (US); Daniel Martin Del Aguila, Parkland, FL (US); James Salvatore Aversa, Jr., Coral Springs, FL (US); Charles Dow McVean, Memphis, TN (US); Leroy Pearce McCarty, Jr., Tupelo, MS (US); Kenneth Roger D'Angelo, Montrose, NY (US)

(73) Assignee: CR DESIGN & DEVELOPMENT, LLC, Deerfield Beach, FL (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/800,559

(22) Filed: Feb. 25, 2020

(65) Prior Publication Data

US 2020/0189687 A1    Jun. 18, 2020

Related U.S. Application Data

(63) Continuation of application No. 16/130,805, filed on Sep. 13, 2018, now Pat. No. 10,569,833.

(51) Int. Cl.
*B62M 6/70*      (2010.01)
*B62K 25/28*     (2006.01)
(Continued)

(52) U.S. Cl.
CPC ............... *B62M 6/70* (2013.01); *B62K 25/28* (2013.01); *B62M 9/04* (2013.01); *B62K 5/02* (2013.01)

(58) Field of Classification Search
CPC .......... B62M 6/70; B62M 9/04; B62M 11/04; B62M 9/00; B62M 6/40; B62K 25/28; B62K 5/02
See application file for complete search history.

(56) References Cited

U.S. PATENT DOCUMENTS 4,111,274 A  *  9/1978  King ..................... B60L 58/18
                                                180/206.2
5,853,062 A  * 12/1998  Hulett .................... B62M 6/55
                                                180/206.4
(Continued)

OTHER PUBLICATIONS

International Search Report and Written Opinion for International Application No. PCT/US2019/050645, dated Jan. 6, 2020.

*Primary Examiner* — Kevin Hurley
*Assistant Examiner* — Marlon A Arce
(74) *Attorney, Agent, or Firm* — The Concept Law Group, PA; Scott D. Smiley; Scott M. Garrett

(57) ABSTRACT

A velocipede includes a pedal crank for pedals to allow an operator to power the velocipede, and a transmission hub or component that is coupled to the pedal crank by a first chain or belt. The transmission component is located rearward of the pedal crank in the frame of the velocipede, such as under a seat position, and is further connected to a rear wheel at an output of the transmission component by a second chain or belt. The transmission has an output that is coupled to a rear wheel assembly. In some embodiments the rear wheel assembly can be mounted in a swingarm that pivots about a transverse axis defined by the output of the transmission. In some embodiments the rear wheel assembly can include an electric motor to drive a rear wheel.

16 Claims, 9 Drawing Sheets

(51) Int. Cl.
*B62M 9/04* (2006.01)
*B62K 5/02* (2013.01)

(56) References Cited

U.S. PATENT DOCUMENTS

| | | | | |
|---|---|---|---|---|
| 7,661,501 B1* | 2/2010 | Perdue | ............... | B60L 50/16 |
| | | | | 180/210 |
| 9,079,634 B2* | 7/2015 | Stieger | ............... | B62M 6/55 |
| 9,221,516 B1* | 12/2015 | Song | ............... | B62M 11/16 |
| 9,469,373 B2* | 10/2016 | Faille | ............... | B62M 6/55 |
| 2010/0327674 A1* | 12/2010 | Marsh | ............... | H02K 5/20 |
| | | | | 310/44 |

* cited by examiner

VELOCIPEDE HAVING SPLIT DRIVE TRAIN

CROSS REFERENCE

This application is a continuation application of U.S. application Ser. No. 16/130,805, now U.S. Pat. No. 10,596,833, filed on Sep. 13, 2018, the entirety of which is hereby incorporated by reference.

FIELD OF THE INVENTION

The present invention relates generally to pedal powered vehicles including bicycles and tricycles, and, more particularly, relates to a hybrid pedal and electric powered vehicle including a rear suspension system that does not require a tensioner or derailleur.

BACKGROUND OF THE INVENTION

Hybrid bicycles that include an electric motor, in addition to a more conventional pedal crank for powering the bicycle, are becoming increasingly popular. The electric motor makes it much easier to climb hills and ride long distances, thereby making the bicycle or similar personal transportation a more viable transportation option for many people. People who live in hilly geography, for example, can be discouraged from using a bicycle because of the physical exertion required to pedal the bicycle up hills. With an electric motor, that effort can be greatly reduced, or even eliminated. Likewise, for longer distances, even in flat geography, a person may not want to pedal the entire duration of a commute or trip. Even though effort may be minimal, it still requires effort, which can cause a person to sweat, for example, which may not be desirable for commuting to work. With an electric motor powered bicycle, however, a person can chose to expend very little effort, and arrive at their destination without having to sweat.

Another issue with bicycle transportation that has discouraged some people is the difficulty of operating gear shifters. Having different gearing ratios is an advantage as gearing can allow the bicycle to move faster with the same or similar pedal rate as used at a lower speed with a different gearing ratio, so that the user can pedal at a similar comfortable rate at various speeds. Providing different and selectable gearing ratios on a bicycle can also allow a rider to achieve mechanical advantages by increasing the peddle rate relative to speed of the by bicycle, which facilitates climbing hills more easily than would be possible with a fixed gearing ratio. However, manual gear shifters conventionally require a derailleur that can be difficult to operate, and are discontinuous, resulting in sudden changes in pedal rate. Furthermore, with a manually operated derailleur, the user can "miss" the intended gear and engage one that is higher or lower than intended, necessitating a corrective, subsequent gear shift. Derailleurs also require regular adjustments to keep the chain tight enough to prevent inefficient and undesirable chain slap caused by a slack chain as can result from the chain being stretched over time.

Another feature of modern bicycle and pedal powered transportation that is popular is suspension. A suspension allow the wheels to move relative to the frame to absorb the effect of bumps and other changes in the terrain being travelled over. A rear suspension employs a swingarm on which the rear wheel is mounted. The swing arm is pivotally mounted to the frame, and pivots about its mounting point. As the end of the swingarm travels up and down, the distance between the rear axle and the drive gear (e.g. at the pedals in a conventional bicycle) changes. Accordingly, the chain (or belt) needs to be long enough to accommodate the maximum distance between the drive axis and the rear wheel axle. However, slack in the chain is then evident when the suspension is not in a position requiring maximum chain length. This slack would cause the chain to jump gears or come completely off the gears. A derailleur uses a chain tensioner to account for changing gears and the different chain length needed for different gears. So when a derailleur is used in a system with a suspension the derailleur can also prevent slack in the chain as the swingarm moves relative to the frame.

However, a recent advance in bicycle technology has been the use of a continuously variable transmission (CVT), instead of a conventional gearing system. A CVT eliminates the problems associated with conventional gear shifting derailleur systems. However, when a suspension is used, there is still the problem of the distance between the rear axle and the drive axis changing as the swingarm travels up/down. As a result, even with a CVT, there is still a need for a chain/belt tensioner in systems employing a suspension.

Therefore, a need exists to overcome the problems with the prior art as discussed above.

SUMMARY OF THE INVENTION

The invention provides a velocipede with a split drive that overcomes the hereinafore-mentioned disadvantages of the heretofore-known devices and methods of this general type and that can be configured in a semi-recumbent form having a rear suspension that avoid the need for a chain or belt tensioner.

With the foregoing and other objects in view, there is provided, in accordance with the invention, a hybrid pedal and electric powered vehicle which includes a frame having a seat mount and a neck that is forward of the seat mount that is configured to couple with a front wheel assembly. The hybrid pedal and electric powered vehicle can further include a pedal crank positioned forward of the seat mount and having a pedal crank sprocket, and a transmission component positioned behind the pedal crank. The transmission component can define a transverse axis, and includes a first sprocket on a first side of the transmission component on the transverse axis that is configured to couple to the pedal crank sprocket by a chain or belt. The transmission component can further include a second sprocket on a second side of the transmission component on the transverse axis. The hybrid pedal and electric powered vehicle can further a swingarm coupled to the frame by a suspension component. The swingarm can be coupled to the frame at a pivot point that is coaxial with the transverse axis of the transmission component to eliminate the need for any chain tensioner. The hybrid pedal and electric powered vehicle can further a rear wheel mounted in the swingarm having a drive sprocket configured to couple to the second sprocket of the transmission component by a chain or belt, and further includes an electric hub motor in a hub of the rear wheel.

In accordance with some embodiments, the transmission component is a continuously variable transmission.

In accordance with some embodiments, the transmission component is positioned below the seat mount.

In accordance with some embodiments, the transmission component is mounted between a first mounting plate and a second mounting plate that are coupled to the frame on respective sides of the transmission component. The transmission component can include a spindle that extends outwards along the transverse axis. A first portion of the spindle extends through an aperture in the first mounting plate, and a second portion of the spindle extends through an aperture in the second mounting plate. The swingarm includes a first arm and a second arm which each have an aperture at a main pivot portion of each arm. A first swingarm bearing assembly is disposed in the aperture of the first arm, and a second swingarm bearing assembly is disposed in the aperture of the second arm. A first swingarm bushing is disposed in a center of the first swingarm bearing assembly and a second swingarm bushing is disposed in a center of the second swingarm bearing assembly. The first and second swingarm bushings are each keyed to fit into the respective apertures of first and second mounting plates. The spindle extends through each of the first and second swingarm bushings through a keyed slot, as retained by a nut.

In accordance with some embodiments, the first and second mounting plates are each connected to a lower horizontal frame member, a first rear vertical frame member, and a second rear vertical frame member.

In accordance with some embodiments, the first and second swingarm bearing assemblies comprise tapered bearings.

In accordance with some embodiments, the hybrid pedal and electric powered vehicle is a bicycle arranged in a semi recumbent configuration.

In accordance with some embodiments, the inventive features of the invention provide a hybrid velocipede that includes a frame, a pedal crank mounted in the frame, and a transmission component mounted in the frame, rearward of the pedal crank, and having a input configured to be coupled to the pedal crank, and an output. The hybrid velocipede can further include a rear wheel assembly coupled to the output of the transmission, and have an electric motor configured to drive a rear wheel of the rear wheel assembly.

In accordance with some embodiments, the output of the transmission defines a transverse axis, the hybrid velocipede further comprises a rear suspension system including a swingarm that is mounted to the frame so as to pivot about the transverse axis and which supports the rear wheel assembly.

In accordance with some embodiments, the transmission component is a continuously variable transmission.

In accordance with some embodiments, the transmission component is positioned below the seat mount.

In accordance with some embodiments, the transmission component is mounted between a first mounting plate and a second mounting plate. The transmission component includes a spindle that extends outwards along the transverse axis. A first portion of the spindle extends through an aperture in the first mounting plate, and a second portion of the spindle extends through an aperture in the second mounting plate. The swingarm can include a first arm and a second arm which each have an aperture at a main pivot portion of each arm. A first swingarm bearing assembly is disposed in the aperture of the first arm, and a second swingarm bearing assembly is disposed in the aperture of the second arm. A first swingarm bushing is disposed in a center of the first swingarm bearing assembly and a second swingarm bushing is disposed in a center of the second swingarm bearing assembly. The first and second swingarm bushings are each keyed to fit into the respective apertures of first and second mounting plates. The spindle extends through each of the first and second swingarm bushings through a keyed slot, as retained by a nut.

In accordance with some embodiments, the hybrid pedal and electric powered vehicle is a bicycle arranged in a semi recumbent configuration.

In accordance with some embodiments, the inventive features of the invention provide a pedal driven velocipede that includes a frame including a seat mount, a front steering mount at a front of the frame, and a pedal crank mount in which a pedal crank is mounted. The pedal driven velocipede can further include a transmission hub mounted on the frame rearward of the pedal crank mount that is configured to be coupled to the pedal crank via a chain or belt at a first side of the transmission hub. The transmission hub further has a drive at a second side of the transmission hub defining a transverse axis relative to the frame. The pedal driven velocipede can further include a swingarm that is mounted to the frame such that it pivots about the transverse axis of the transmission hub, and which is further coupled to the frame via a suspension component. The pedal driven velocipede can further include a rear wheel mounted on the swingarm that is coupled to the drive of the transmission hub at the second side of the transmission hub via a chain or belt.

In accordance with some embodiments, the transmission hub comprises a continuously variable transmission.

In accordance with some embodiments, the rear wheel further comprises an electric motor in a hub of the rear wheel.

In accordance with some embodiments, the pedal drive velocipede is a bicycle.

In accordance with some embodiments, the transmission hub is located substantially under the seat mount.

In accordance with some embodiments, the frame includes a lower horizontal frame member, a first rear vertical frame member attached to the lower horizontal frame member and which supports the seat mount, and a second rear vertical frame member attached to the lower horizontal frame member rearward of the first rear vertical frame member and which is further coupled to the suspension component. The transmission hub can be attached to the frame between the first and second rear vertical frame members. The left and right swingarm brackets can be attached to the frame on left and right sides, respectively, of the transmission hub, and have swingarm attachment points on the transverse axis without being coupled to the transmission hub. The swingarm can be attached to attachment points on the left and right swingarm brackets.

In accordance with some embodiments, the left and right swingarm brackets are each connected to the lower horizontal frame member, first rear vertical frame member, and second rear vertical frame member.

Although the invention is illustrated and described herein as embodied in a velocipede having a split chain hybrid drive train, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the frame of the velocipede, generally. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
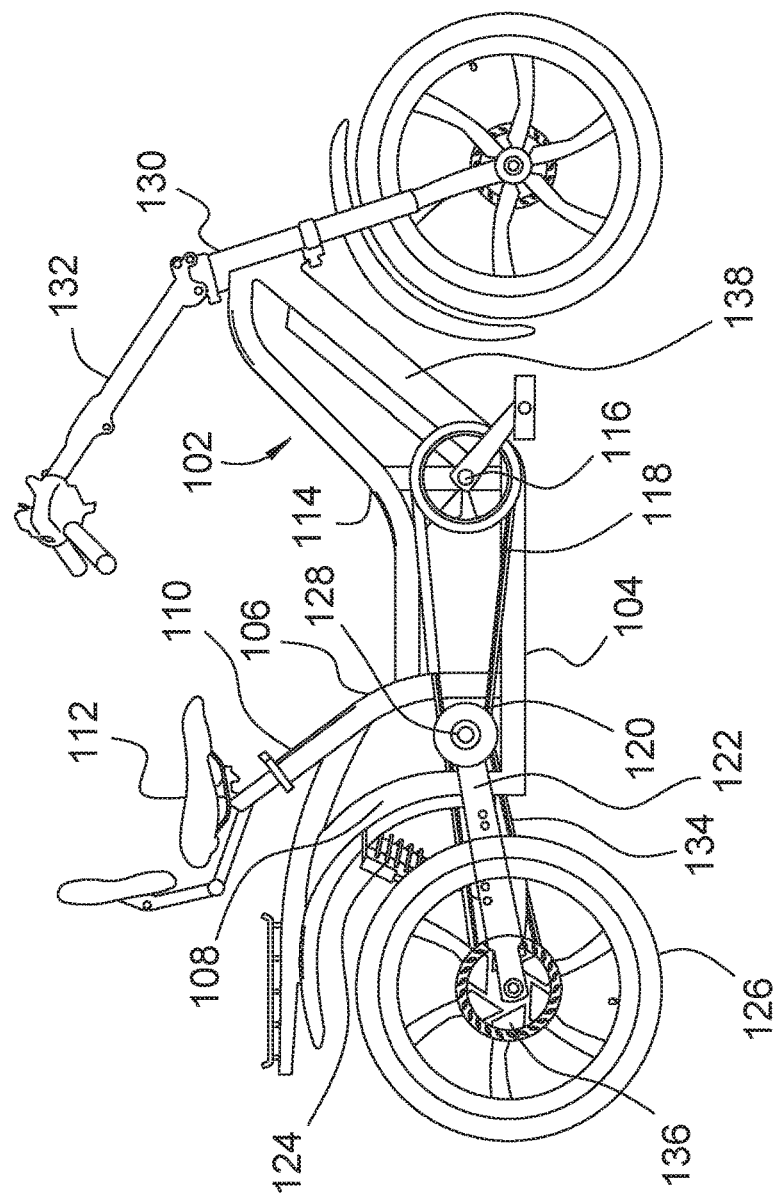
FIG. 1 is a side elevational view of a pedal driven velocipede configured as a bicycle having a center-mounted transmission and rear wheel motor, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient velocipede having a split chain hybrid drive train that combines a pedal crank with an electric motor, a pedal crank with a rear suspension, or both. Further, the inventive velocipede arrangements including a rear suspension are configured in a way that avoids the need for a chain or belt tensioner. Among the inventive arrangements disclosed herein, there are a velocipede having a transmission component centrally located (i.e. under the seat position) with the pedal crank located forward in the frame, in a recumbent or semi-recumbent arrangement. In other inventive arrangements disclosed herein, the velocipede can be arranged with the pedal crank in a conventional position, substantially under the seat position, to allow the user/rider to stand on the pedals and while pedaling. In other inventive arrangements the velocipede can include a rear suspension including a swingarm that pivots around the transverse axis of the transmission component to obviate the need for a chain or belt tensioning device. In other inventive arrangements the disclosed velocipede can include an electric motor in the rear wheel assembly.

Only the splitting of the chain configuration in accordance with the inventive arrangements described herein allows for the use of both a continuously variable hub transmission and a rear hub electric motor. This unique combination accomplishes two important objectives. First, since wire is by far the most efficient way to transmit electric power from where it is stored (the battery) to where it is needed (the rear axle), any routing of this power, after conversion to mechanical power, through any combination of chains, belts and transmissions, is substantially less efficient. Second, because of the heavier weight over the rear wheel, compared to the weight over the front wheel, there is more traction available at the rear wheel. This is especially important when using larger motors (e.g. 500 Watt and above), which will cause a front tire to break traction and spin in front wheel drive configurations.

FIG. 1 is a side elevational view of a pedal driven velocipede configured as a bicycle 100 having a center-mounted transmission and rear wheel motor, in accordance with some embodiments. As used here, the term "velocipede" refers to a wheeled, human powered vehicle, the most common example of which is perhaps the bicycle. However other forms of velocipedes exist, and not all are pedal driven. In general, the velocipede of the present inventive embodiments is pedal drive, with the pedal crank being generally located forward of the seat, and which is linked to a transmission component that is rearward of the pedal crank. The transmission component in turn is linked to the rear wheel, adjusting the ratio of turns between the rear wheel and the pedal crank, as controlled by the operator. The rear wheel can include an electric hub motor, and there can be more than two wheels. In some embodiments the velocipede is configured as a hybrid electric and pedal driven semi-recumbent bicycle as shown in FIG. 1.

In FIG. 1, the bicycle 100 is configured in a semi-recumbent configuration, and includes a frame 102 that has a lower horizontal frame member 104 which substantially spans the length of the frame 102 from the rear to the front of the frame, and connects to a neck 130 which is a front steering mount and is configured to couple to, and which supports a handlebar assembly 132 and a front wheel assembly, as is known. A first rear vertical frame member 106 is coupled to the lower horizontal frame member 104, and supports a seat mount 110 in which a seat 112 can be mounted. A second rear vertical frame member 108 is also coupled to the lower horizontal frame member 104, and is located rearward of the first rear vertical frame member 106. An upper horizontal frame member 114 can be provided above the lower horizontal frame member 104, and be connected between the first rear vertical frame member 106 and the neck 130 to stiffen the frame 102.

A pedal crank 116 is mounted in the frame, and can be mounted forward of the seat mount 110. The pedal crank drives a gear or sprocket around which a chain or belt 118 is routed, and which is also routed around a first sprocket or gear of a transmission component 120. The transmission component 120 is mounted in the frame 102 rearward of the pedal crank 116, and can be mounted at a position in the frame 102 that is substantially beneath the seat mount 110 or seat 112 The transmission element 120 has an input gear or sprocket that is driven by the chain or belt from the pedal crank 116 on a first side of the transmission component 120, and an output gear or sprocket at a second side of the transmission component 120 that drives a chain or belt 134 to the rear wheel. The transmission component can adjust the ratio at which the output gear turns relative to the input gear, and can be a continuously variable transmission which does not have discrete ratios but rather can be varied to any ratio between a minimum and a maximum ratio. The ratio of the transmission component, between the input and the output, can be controlled, for example, by a rotating control on the handlebars (i.e. like a motorcycle throttle).

Between input and output gear, or more specifically, the left and right sides of the transmission component 120, there is defined a transverse axis on which the input and output gears are mounted. This transverse axis is also the pivot point for a swingarm 122. The swingarm 122 holds the rear wheel 126 and is connected to a suspension component 124 which is further connected to the frame at, for example, second rear vertical frame member 108. The suspension component 124 can include a dampened spring system, and can include a "shock absorber" on each side of the swingarm 122. The swingarm 122 is mounted to the frame such that it pivots about the transverse axis 128 defined by the transmission component 120. By mounting swingarm 122 so that it pivots about the transverse axis 128, the distance between the transverse axis 128 and the axle of the rear wheel never changes, and as a result, there is no need for a chain tensioner for the rear chain 134 between the transmission component 120 and the rear wheel sprocket.

To aid in propelling the bicycle 100, the rear wheel 126 can contain an electric hub motor 136 that is powered by a battery 138. The electric motor 136 can be used by the operator at the operator's discretion, allowing the operator to provide all the power to propel the bicycle by pedaling, thereby saving battery charge, or by assisting the operator when, for example, going up a hill, or as the main propulsion where the operator doesn't pedal at all. The configuration of the bicycle 100 can easily be adapted to a tricycle configuration by extending the rear axle and adding another rear wheel on the axle, as is known.

Figure 2:
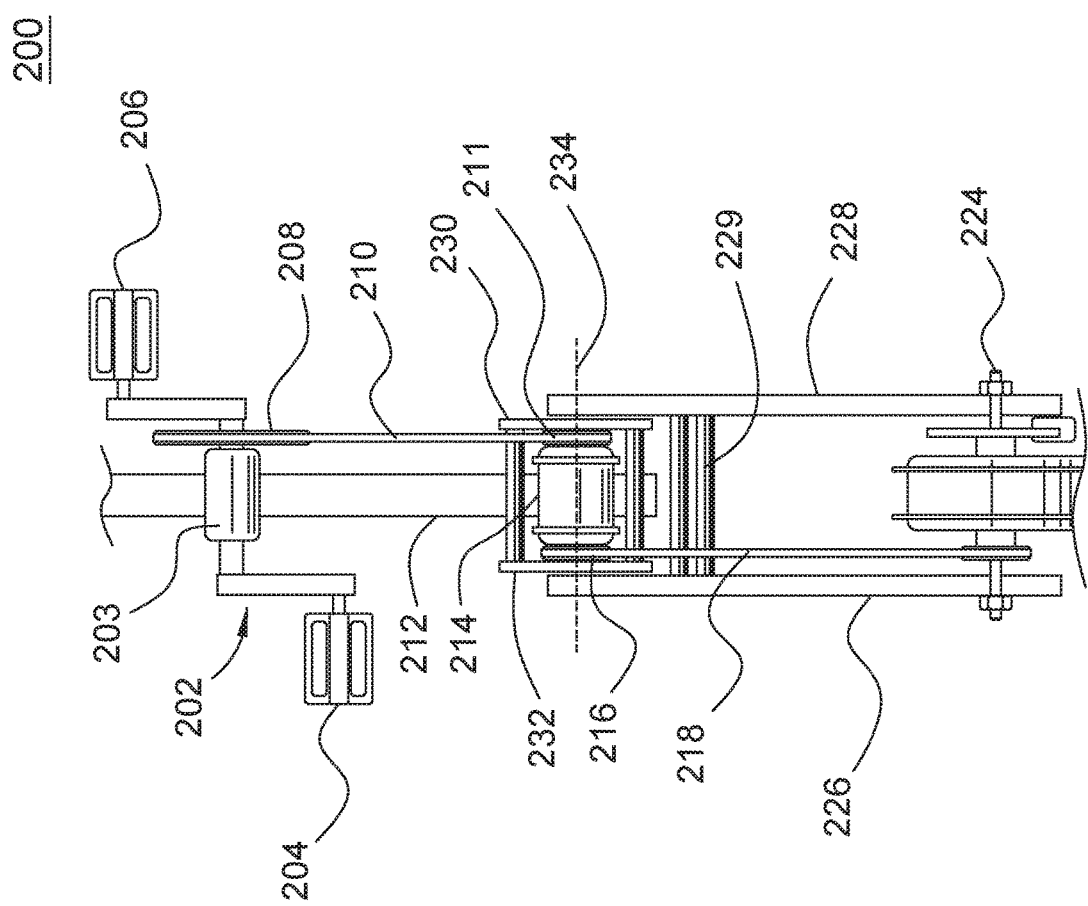
FIG. 2 is a top plan view of pedal driven velocipede having a center-mounted transmission, in accordance with some embodiments.

FIG. 2 is a top plan view of pedal driven velocipede 200 having a center-mounted transmission, in accordance with some embodiments. The velocipede 200 can be the bicycle 100 of FIG. 1, or a similar arrangement with additional wheels. The view shown here provides some additional detail of the drive system being used, showing how the drive train is split, and how the need for a chain tensioner is avoided. A pedal crank 202 is provided in a pedal crank mount 203 on the frame, and is configured to be operated by a user by engaging a pair of pedals 204, 206, as is known. The pedal crank 202 is connected to a pedal crank sprocket 208 that is fixed to the pedal crank and therefore revolves at the same rate as the operator revolves the pedals 204, 206 about the transverse axis (left to right, as shown) of the pedal crank 202. The pedal crank 202 can be an industry standard crankset, and can be mounted in an eccentric bottom bracket. The sprocket 208 drives a chain or belt 210 that is also coupled around an input sprocket 211 of a transmission component 214. Both the transmission component 214 and the pedal crank 202 can be mounted in the frame 212, such as on a lower horizontal frame member (e.g. 104 of FIG. 1). The transmission component 214 adjusts a turning ratio between the input sprocket 211 and an output sprocket 216. The output sprocket 216 is on a spindle or axle that defines a transverse axis 234 and drives a second belt or chain 218. The input sprocket 211 can also be positioned on the transverse axis 234, or it can be positioned elsewhere, depending on the construction of the transmission component 214. The transmission component 214 can be a CVT type transmission that is controllable by the operator, and which avoids the problems associated with prior art systems like those using a derailleur.

A swingarm can be comprised of two opposing arms 226, 228 that can be joined together by one or more cross members 229. The arms 226, 228 are coupled to the frame such that they have a pivot point on the transverse axis 234. To accomplish this, a pair of mounting brackets 230, 232 (also referred to herein as left and right, or first and second, mounting brackets or plates) are coupled to the frame 212 on both sides (i.e. the left and right sides) of the transmission. The plates have keyed holes to accept a swingarm bushing which has a keyed hole to accept the spindle of the transmission component 214 on the transverse axis 234 and provide support for the transmission component 214. The swing arm bushing captures the bearings of the arm, and a nut attaches to the spindle to hold the assembly together. The arms 226, 228, at their respective distal ends, accept an axle 224 for the rear wheel. The rear wheel can be driven by an electric hub motor 220, and also by a chain or belt 218 that is driven by the transmission component 214, as driven by the pedal crank 202. The belt or chain 218 fits over a rear wheel sprocket 222 to drive the rear wheel. The rear wheel sprocket 222 can provide power in addition to the electric hub motor 220, on instead of using the electric hub motor 220, or even not at all, letting the electric hub motor 220 provide all the power. The arms 226, 228 can move by pivoting around the transverse axis 234, meaning that at the transverse axis 234 the arms only rotate about the transverse axis. At the other end of the arms 226, 228, near the rear axle 224, the distal ends of the arms 226, 228 move in a direction that is in and out of the page, while connected to a suspension system (not shown here).

Figure 3:
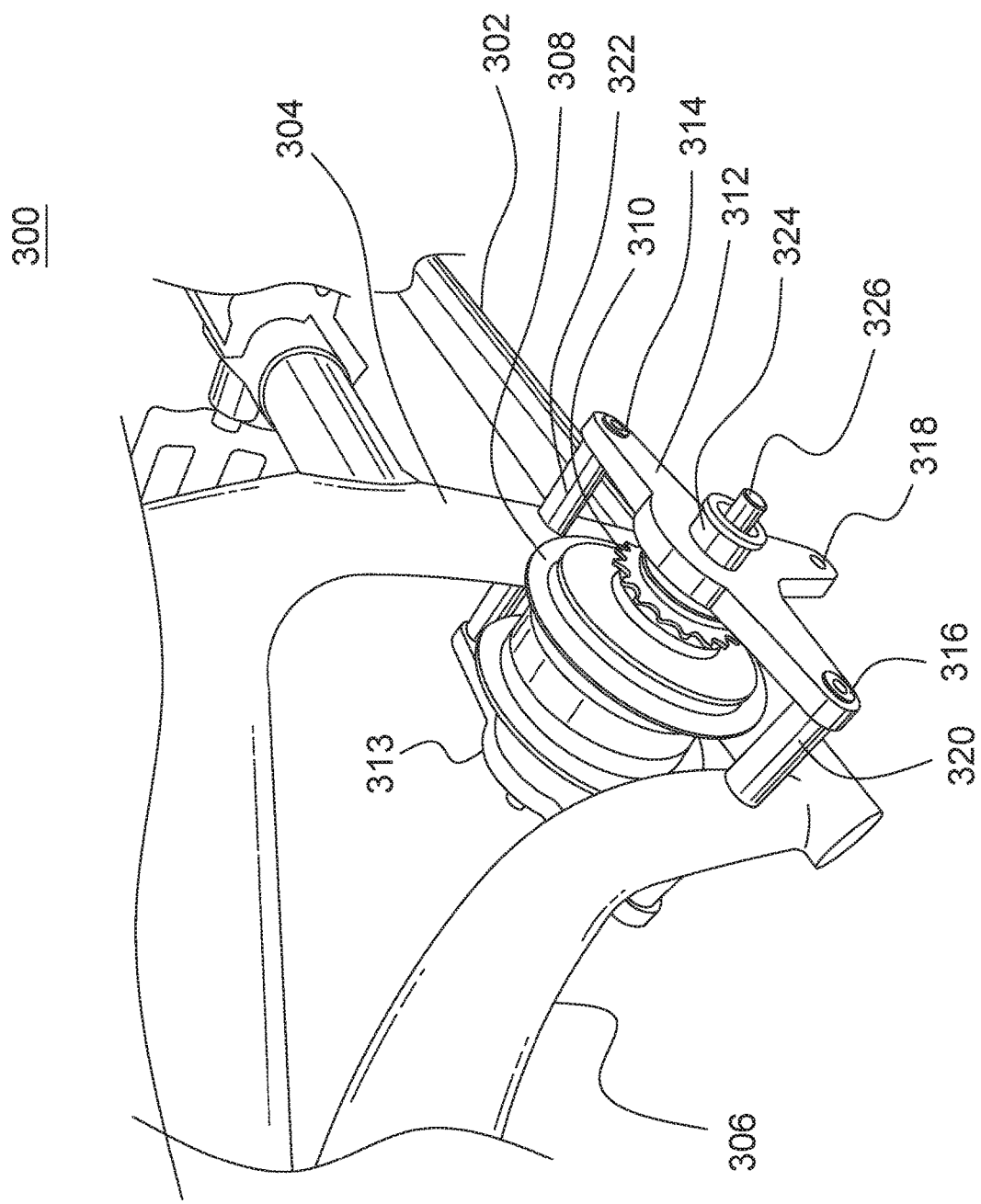
FIG. 3 is an isometric view of a center-mounted transmission in a pedal driven velocipede, in accordance with some embodiments.

FIG. 3 is an isometric view of a center-mounted transmission in a pedal driven velocipede 300, in accordance with some embodiments. The view here is from the right rear of the transmission, and the lower horizontal frame member 302 is seen with the first rear vertical frame member and a second rear vertical frame member 306 coupled to, and extending upward from, the lower horizontal frame member 302. A transmission component 308 is mounted between the first rear vertical frame member 304 and the second rear vertical frame member 306, and generally under the seat position (seat not shown here). The transmission component 308 includes an input sprocket 310 which is coupled to the pedal crank by a chain or belt, and is mounted between two brackets 312, 313 on the right and left sides, respectively, of the transmission component 308. The transmission component 308 includes a spindle on both sides that extends outward, and which defines a transverse axis. The brackets 312, 313 span a distance between the front and rear vertical frame members 304, 306, and can have a portion that extends downward to be co-level with the lower horizontal frame member 302 as well. Further, the brackets 312, 313 have an aperture that, upon the bracket being mounted to the frame, is on the transverse axis of the transmission component 308. The aperture is keyed (e.g. circular with a flat or non-circular portion), and is sized to receive a swingarm bushing 324 that has an extension shaped in correspondence with the keyed aperture of the bracket. Although the swingarm bushing 324 is shown in place here, ordinarily an arm of the swingarm would be first placed in position, and the swingarm bushing 324 is then placed through a bearing assembly of the swingarm. The swingarm bushing 324 has an outside lip that retains the bearing assembly of the of the swingarm. Once the swingarm and swing arm busing 324 are in position, a retaining nut 326 is placed on the spindle of the transmission component 308 to retain the swingarm bushing in place. There is a keyed hole through the swingarm bushing 324 that corresponds to the keyed shape of the spindle of the transmission component 308. The brackets 312, 313 are coupled to the frame member 302, 304, 306 through coupling members 320, 322 which space the brackets 312, 313 from the frame members 302, 304, 306 to allow space for the input and output sprockets, and to interface with the spindle ends on each side of the transmission component 308. The brackets 312, 313 can be bolted to the coupling members 320, 322 with bolts 316, 314 through holes such as hole 318. The coupling member 320, 322 can pass through the frame members 304, 306, and should be rigidly attached to the frame members 304, 306.

Figure 4:
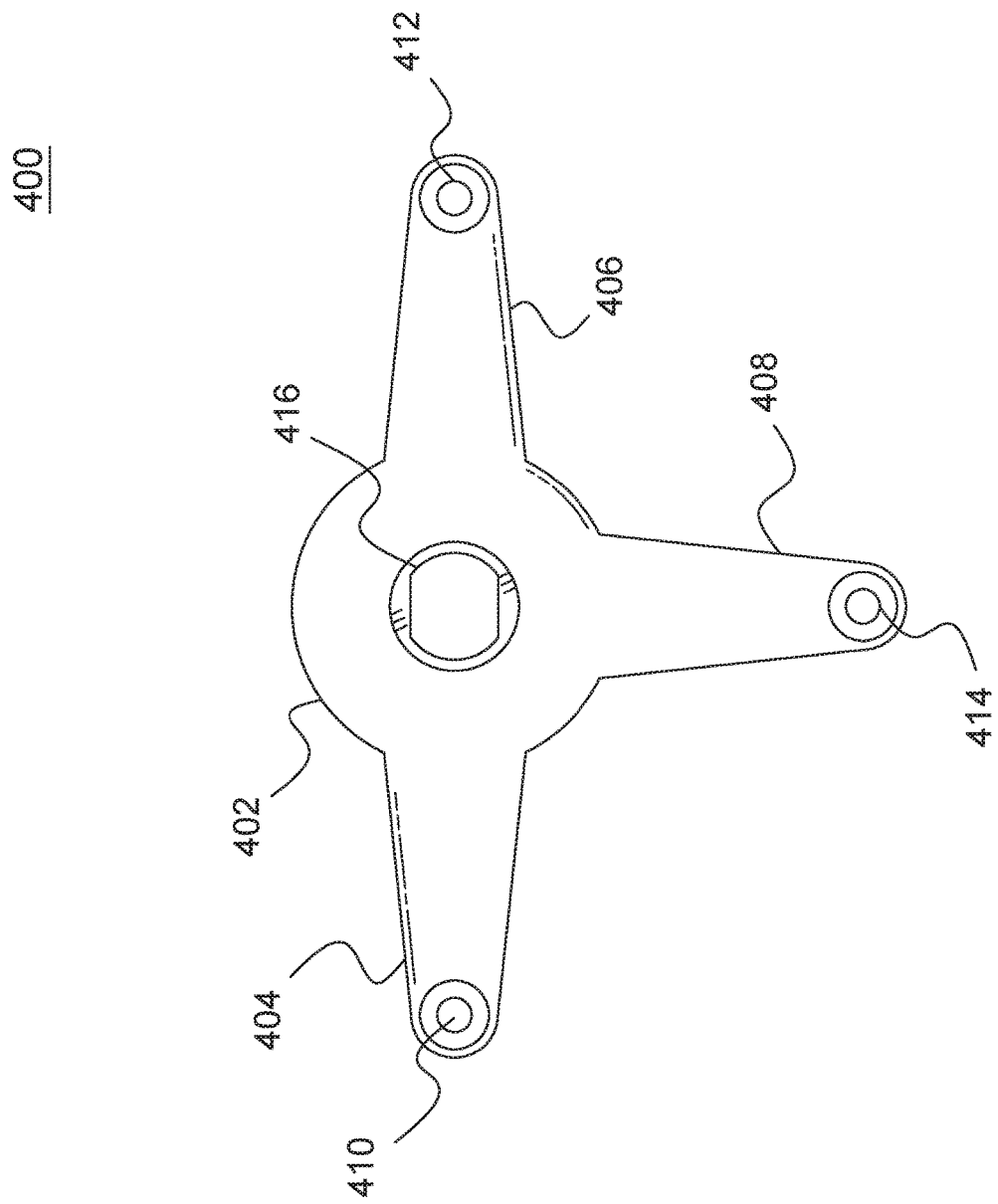
FIG. 4 is an elevational view of a mounting plate for mounting a swingarm so that the pivot point of the swingarm is coaxial with a transverse axis of the center-mounted transmission, in accordance with some embodiments.

FIG. 4 is an elevational view of a mounting plate 400 for mounting a swingarm so that the pivot point of the swingarm is coaxial with a transverse axis of the center-mounted transmission, in accordance with some embodiments. The mounting plate 400 is substantially equivalent to the brackets, 312, 313 of FIG. 3, as well as 230, 232 of FIG. 2. The mounting plate 400 include a main portion 402 for mounting the transmission component and swingarm, and several arm portions 404, 406, 408 for coupling to the frame of the velocipede. In the middle of the main portion 402 is an aperture 416 that is keyed. The aperture 416 is also the attachment point or pivot point for a respective arm of the swingarm. As shown here, the keying is accomplished by flattening opposing sides of the otherwise circular aperture 416. Each arm portion 404, 406, 408 includes a hole 410, 412, 414, respectively. The holes 410, 412, 414 allow bolts to pass through the mounting plate to connect with a coupling member such as coupling members 320, 322 of FIG. 3.

Figure 5:
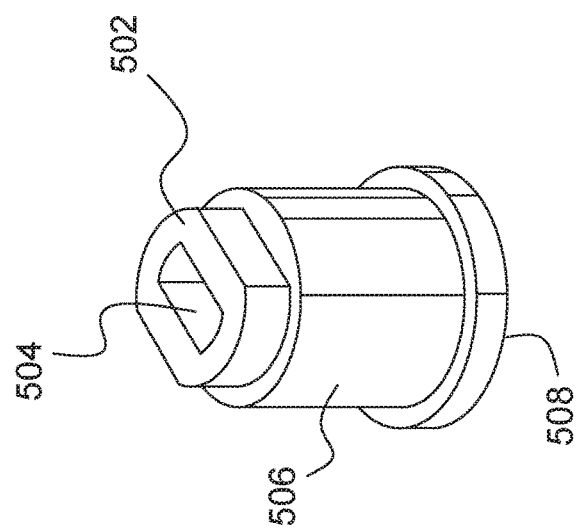
FIG. 5 is an isometric view of a swingarm retaining hub for mounting a swingarm on a velocipede, in accordance with some embodiments.

FIG. 5 is an isometric view of a swingarm bushing 500 for mounting a swingarm on a velocipede, in accordance with some embodiments. The swingarm bushing 500 can be substantially equivalent to swingarm bushing 324 of FIG. 3, and include an keyed extension 502 that fits into the keyed aperture (e.g. 416) of a mounting plate or bracket. The extension has a keyed slotted opening 504 sized to accept the spindle of the transmission component (which can be flat on opposing sides) while preventing the spindle from rotating in the slotted aperture 504. The swingarm bushing 500 further includes a cylindrical body 506 which is sized to fit within the bearing assembly of an arm of the swingarm. At the outside of the swingarm bushing 500 is a retaining lip 508 that is coaxial with the cylindrical body 506, but has a larger diameter than the cylindrical body 506.

Figure 6:
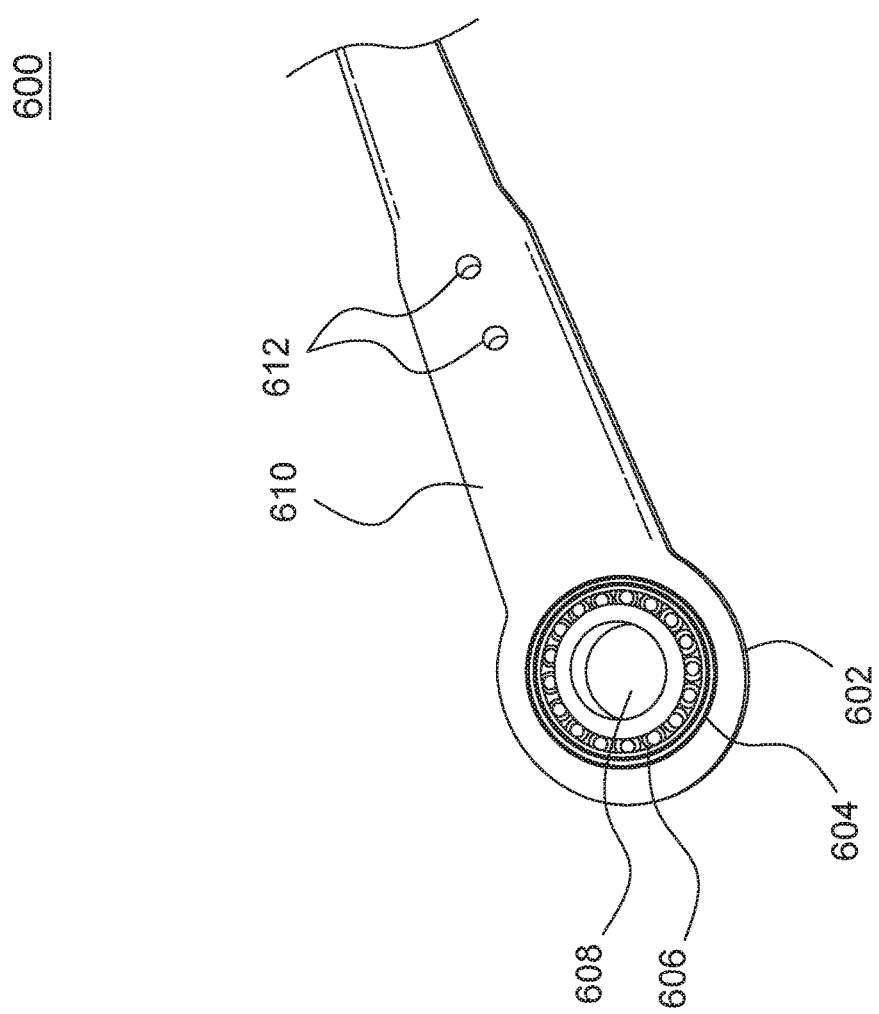
FIG. 6 shows the pivot end of a swingarm assembly, in accordance with some embodiments.

FIG. 6 shows the pivot end of a swingarm assembly, in accordance with some embodiments. In particular, one arm 600 of a swingarm is shown, where a swingarm can include two such arms 600, which can be substantially identical. The arm includes a main pivot portion 602 which includes a circular aperture 604 in which a bearing assembly 606 is mounted. The bearing assembly 606 can include outside tapered bearing races pressed into the aperture 604 from an exterior side of the arm 600. The center of the bearing assembly is sized to fit over the cylindrical body of a swingarm bushing (e.g. 506). A support portion 610 of the arm 600 can include through holes 612 for mounting the arm 600 to cross members (e.g. 229) that couple to the opposing arm to make up the swingarm or swingarm assembly.

Figure 7:
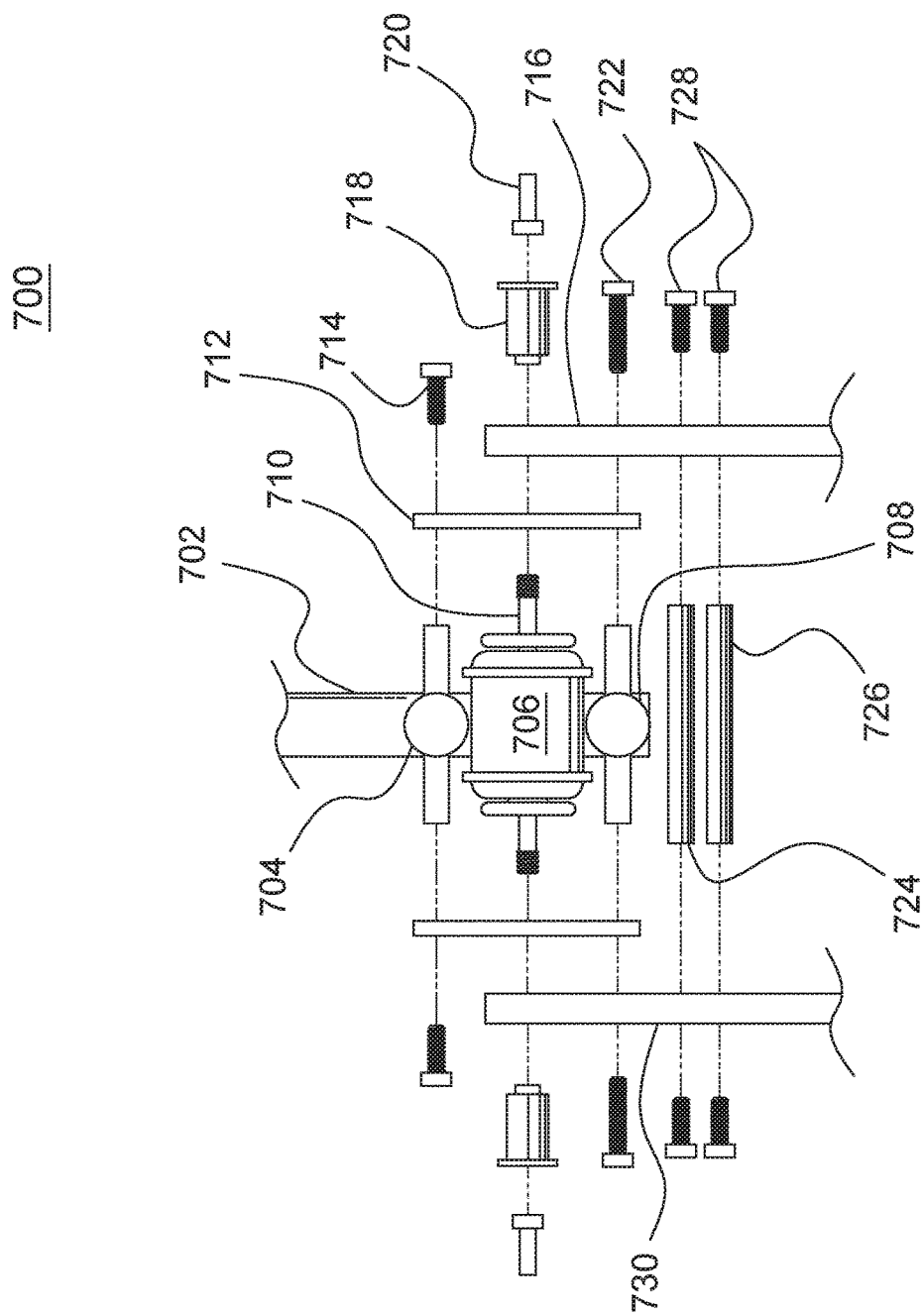
FIG. 7 shows a top assembly view of a center-mounted transmission for a pedal driven velocipede, in accordance with some embodiments.

FIG. 7 shows a top assembly view of a center-mounted transmission and swingarm assembly 700 for a pedal driven velocipede, in accordance with some embodiments. This view shows a portion of a similar view shown in FIG. 2, but in an exploded (disassembled) form. A frame of the pedal drive velocipede includes a lower horizontal frame member 702 (substantially similar to 104 in FIG. 1), with a first rear vertical frame member 704 and a second rear vertical frame member 708 rising from, and attached to, the lower horizontal frame member 702. A transmission component 706 is located between the first and second rear vertical frame members 704, 708. As previously described, the transmission component 706 includes an input sprocket that is driven by a chain or belt connected to a pedal crank (not shown here), and an output sprocket that is connected to a rear wheel (not shown) by a chain or belt. The input sprocket drives the output sprocket at a variable turns ratio which can be adjusted by a user over a continuous ratio range.

In the view only components on the right side of the frame are described as their mirrored components on the left side are substantially identical. Extending outwards from the transmission component 706 laterally at each side is a spindle 710. The spindle 710 passes through a mounting plate or bracket 712 (e.g. 400 of FIG. 4), and a swingarm bushing 718. The mounting plate 712 is attached to the frame by, for example, bolts 714, 722 which can couple to coupling members in the frame horizontal and vertical frame elements as previously described. The mounting plate 712 also includes a keyed aperture through which the spindle 710 passes. An arm 716, such as that shown in FIG. 6, includes a swingarm bearing assembly with an opening through which the spindle 710 passes. A swingarm bushing 718 (e.g. 500) includes a keyed extension that fits into the keyed aperture of the arm 716. The keyed extension of the swingarm bushing 718 includes a slot (e.g. 504) that is sized to receive and hold the spindle 710, which has corresponding flat sides. The swingarm bushing 718 engages the bearing assembly in the arm 716, and retains the bearing assembly and arm 716 by an extended lip (e.g. 508). The end of the spindle 710 is threaded (on the non-flat portion), and receives a nut 720 that bears against the swingarm bushing 718 and retains the assembly together, allowing the arm 716 to pivot about the transverse axis of the spindle 710. The opposing arm 730 is assembled onto the other side of the transmission component in mirrored fashion.

To couple the arm 716 and opposing arm 730 together to form the swingarm, each arm 716, 730 can be bolted to coupling members 724, 726 (which can be similar to coupling member 229) using bolts 728 that pass through the arm 716 and into threads in the coupling members 724, 726. The coupling members 724, 726 therefore are positioned between the rear wheel and the second rear vertical frame member 708. Those skilled in the art will appreciate that other arrangements and designs for a swingarm can equivalently be realized. By arranging the design such that the swingarm pivots about the transverse axis on which the drive sprocket of the transmission component is located, the distance between the drive sprocket and the rear wheel sprocket remains constant as the swingarm moves against the suspension component. Since the distance never changes, there is no need for a chain tensioner of any sort. The only adjustment that is needed is to occasionally adjust the position of the rear wheel in the swingarm as the chain or belt between the rear wheel and the transmission component stretches.

Figure 8:
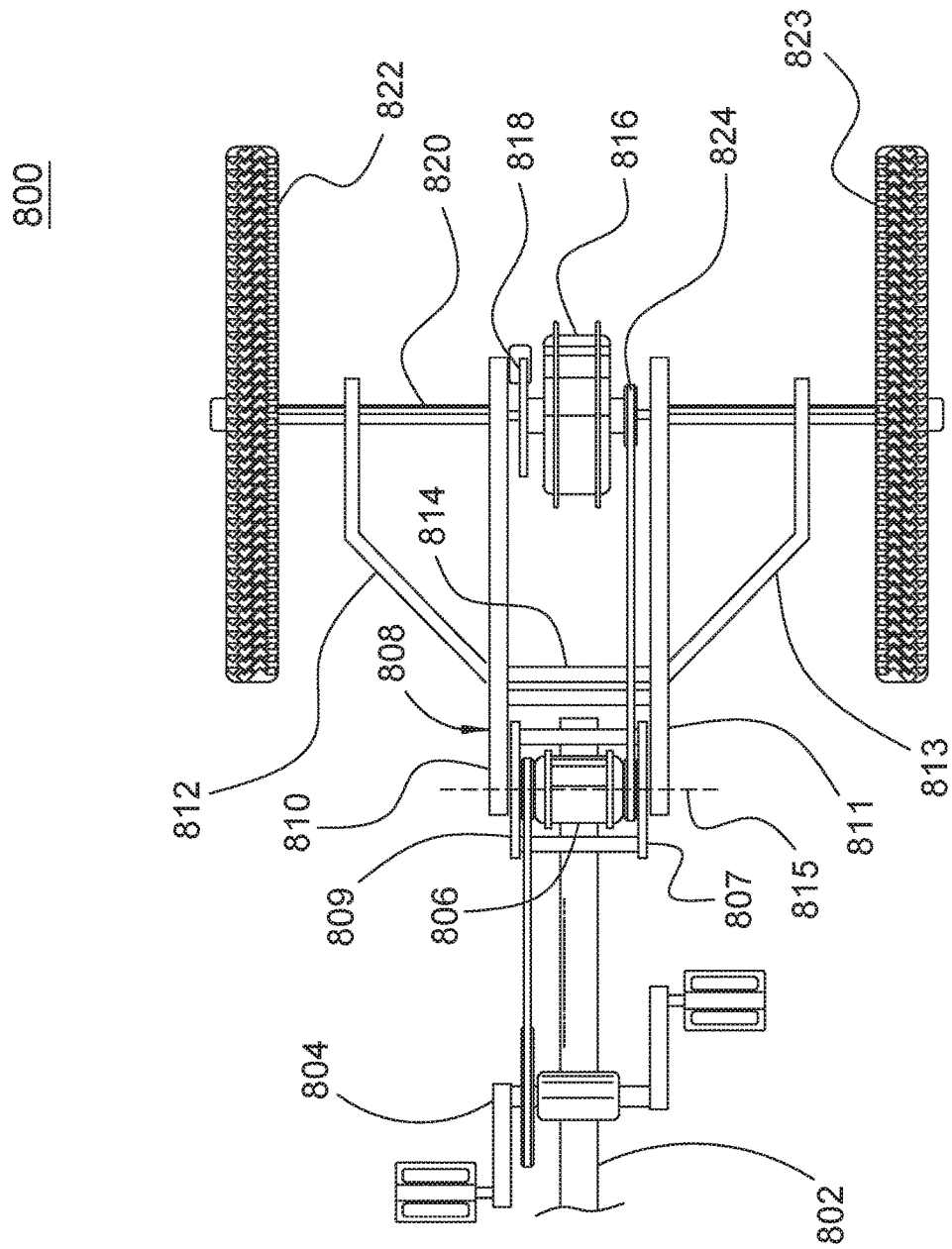
FIG. 8 shows a top plan view of pedal driven tricycle having a center-mounted transmission, in accordance with some embodiments.

FIG. 8 shows a top plan view of pedal driven tricycle 800 having a center-mounted transmission, in accordance with some embodiments. The tricycle 800 is shown as an example of other forms of pedal driven velocipedes that can equivalently implement the inventive arrangements of the disclosure. The tricycle 800 includes a frame that can have a lower horizontal frame member 802 on which a pedal crank 804 can be mounted. Located behind or rearward of the pedal crank 804 is a transmission component 806 having a transverse axis on which a drive or output sprocket rotates. The transmission component further includes an input sprocket that is coupled to the a sprocket of the pedal crank 804 by a chain or belt or an equivalent. A swingarm 808 can be mounted to the frame using a similar arrangement as described previously, such as by use of mounting plates/brackets 807, 809 which can further support the transmission component 806. The swingarm can be comprised of arms 810, 811 that are coupled together by coupling members 814, and which are mounted on the mounting plates 809, 807 to pivot about the transverse axis 815 of the transmission component 806. Outrigger arms 812, 813 can be further coupled to arms 810, 811 to support a rear axle 820 on which rear wheels 822, 823 are mounted. The swingarm 808 is further attached to one or more suspension components that are also mounted to the frame. Since the swingarm 808 pivots about the transverse axis 815 no tensioner is required in the drive to the rear axle sprocket 824. An electric motor 816 can be coupled to the rear axle along with the rear sprocket 824 to drive the rear axle and the rear wheels 822, 823. A rear disc brake assembly 818 can be used to stop the tricycle 800 in a conventional manner. Accordingly, various arrangement of pedal driven velocipedes, including bicycles and tricycles, can be realized using the inventive embodiments and arrangements disclosed herein.

Figure 9:
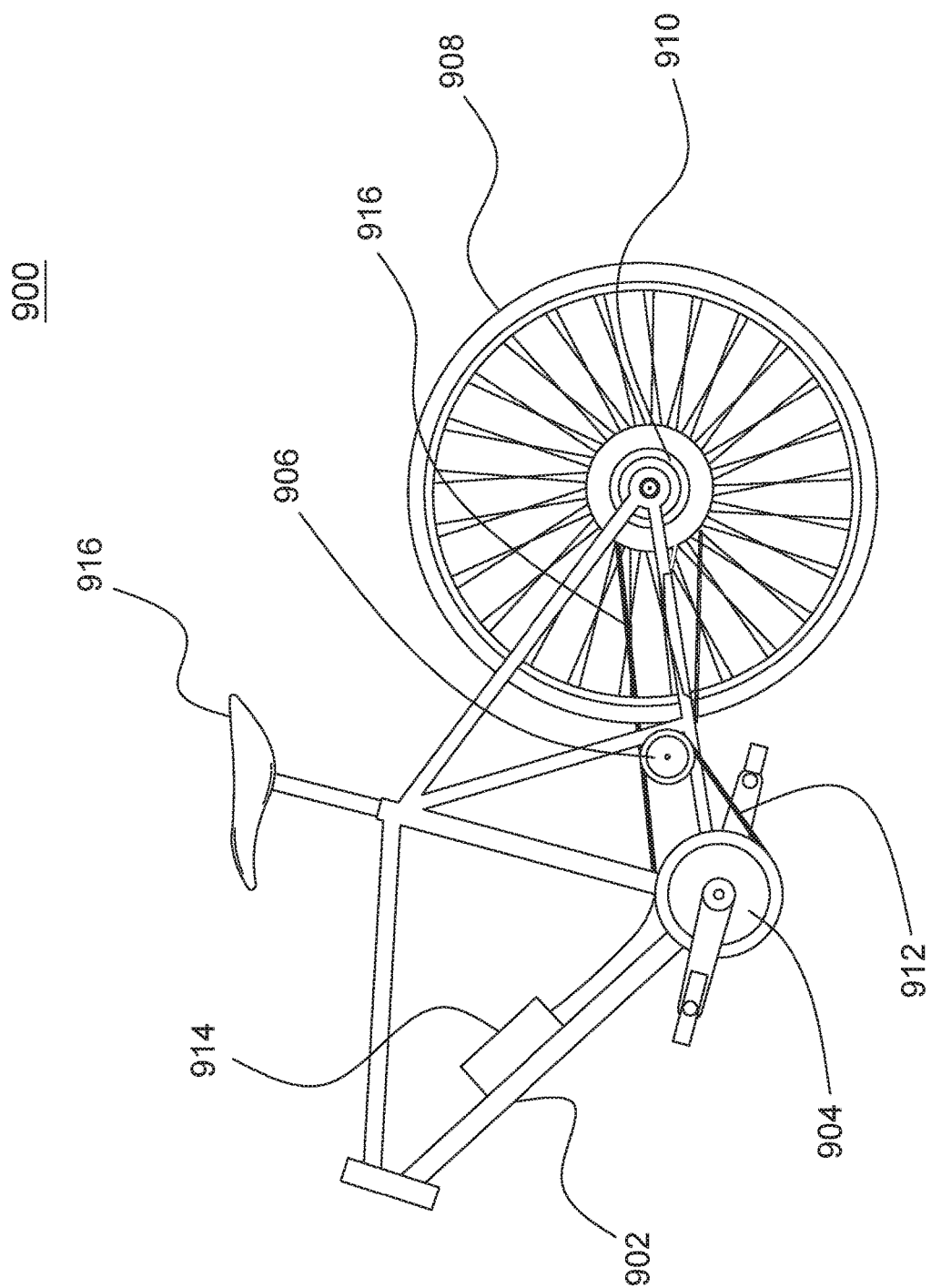
FIG. 9 shows a velocipede having a conventionally located pedal crank with a split drive train, in accordance with some embodiments.

FIG. 9 shows a velocipede 900 having a conventionally located pedal crank 904 with a split drive train, in accordance with some embodiments. A frame 902 is configured in a conventional manner so as to locate the pedal crank substantially below the seat 916, rather than in a recumbent or semi-recumbent configuration. The pedal crank 904 drives a chain or belt 912 that is coupled to the input of a transmission component 906 that is mounted in the frame to the rear of the pedal crank (i.e. "rearward"). The transmission component 906 can be a CVT type transmission, as previously described, and has an output that is coupled to a rear wheel 908 by a chain or belt 916. In some embodiments such as those in accordance with the example of FIG. 9, the frame can lack a rear suspension, and the rear wheel is mounted in the frame in a conventional manner, which is rigidly in the frame. The velocipede 900 can further include an electric motor to drive the rear wheel 908, such as a hub motor 910 that is powered by a battery 914 and controlled by the user/rider with handlebar-mounted controls (not shown), as is known. It will be appreciated by those skilled in the art that the velocipede arrangement of FIG. 9 can be adaptable to both bicycles and tricycles (two rear wheel), as well as other velocipede arrangements, without departing from the spirit and scope of the inventive disclosure. It is further contemplated that a suspension can be used in the more conventional configuration of FIG. 9 by providing a swingarm in which the rear wheel is mounted, and which pivots about the transverse axis of the transmission component 906.

A pedal driven velocipede has been disclosed that uses a "split chain" arrangement with a transmission component located between the pedal crank and the rear wheel. By split chain, it is meant that the transmission component sits in the drive train between the pedal crank and the rear wheel, with a separate chain or belt coupling the transmission component to the pedal crank (at an input) and to the rear wheel(s) (at an output). The inventive velocipede design can, in some embodiments, use a swingarm to provide rear suspension, which avoids the need for a tensioner by mounting the swingarm such that it pivots about the transverse axis of the transmission component. A rear motor can assist the user (or relieve the user) in powering the velocipede. Accordingly, the inventive arrangements can include a hybrid (pedal and electric powered) semi-recumbent velocipede that has a split drive system, and which obviated the need for a derailleur or a chain tensioner. The incentive arrangements can also include a velocipede having a split drive, with a transmission component between the pedal crank and the rear wheel, with the pedal crank located in a conventional position, under the seat position.

Although the invention is illustrated and described herein as embodied in a velocipede having a split drive arrangement, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the frame from front to back, generally. Those skilled in the art can understand the specific meanings of the above-mentioned terms in the embodiments of the present invention according to the specific circumstances.

What is claimed is:

1. A hybrid pedal and electric powered vehicle having a split drive arrangement, comprising:
   a frame having a seat mount, and a neck that is forward of the seat mount that is configured to couple with a front wheel assembly;
   a pedal crank positioned forward of the seat mount and having a pedal crank sprocket;
   a first mounting plate on a first side of the frame and a second mounting plate on a second side of the frame opposite the first mounting plate, wherein the first and second mounting plates are positioned under the seat mount of the frame and rearward of the pedal crank;
   a continuously variable transmission (CVT) mounted between the first and second mounting plates and defining a transverse axis, and having a first sprocket on a first side of the CVT on the transverse axis that is configured to couple to the pedal crank sprocket by a chain or belt, and further having a second sprocket on a second side of the CVT on the transverse axis;
   a swingarm pivotably coupled to the first and second mounting plates at a pivot point that is coaxial with the transverse axis of the CVT and without being attached to the CVT; and
   a rear wheel mounted in the swingarm and having a drive sprocket configured to couple to the second sprocket of the transmission component by a chain or belt, and further including an electric hub motor in a hub of the rear wheel.

2. The hybrid pedal and electric powered vehicle of claim 1, wherein the CVT is positioned below the seat mount.

3. The hybrid pedal and electric powered vehicle of claim 1, wherein the CVT includes a spindle that extends outwards along the transverse axis, wherein a first portion of the spindle extends through an aperture in the first mounting plate, and a second portion of the spindle extends through an aperture in the second mounting plate; and
   the swingarm comprises:
   a first arm and a second arm which each have an aperture at a main pivot portion of each arm;
   a first swingarm bearing assembly disposed in the aperture of the first arm, and a second swingarm bearing assembly disposed in the aperture of the second arm; and
   a first swingarm bushing disposed in a center of the first swingarm bearing assembly and a second swingarm bushing disposed in a center of the second swingarm bearing assembly, wherein the first and second swingarm bushings are each keyed to fit into the respective apertures of first and second mounting plates; and wherein the spindle extends through each of the first and second swingarm bushings through a keyed slot, as retained by a nut.

4. The hybrid pedal and electric powered vehicle of claim 3, wherein the first and second mounting plates are each connected to a lower horizontal frame member, a first rear vertical frame member, and a second rear vertical frame member.

5. The hybrid pedal and electric powered vehicle of claim 3, wherein the first and second swingarm bearing assemblies comprise tapered bearings.

6. The hybrid pedal and electric powered vehicle of claim 1, wherein the hybrid pedal and electric powered vehicle is a bicycle arranged in a semi recumbent configuration.

7. A hybrid velocipede having a split drive configuration, comprising:
  a frame;
  a pedal crank mounted in the frame;
  a first mounting plate on a first side of the frame and a second mounting plate on a second side of the frame opposite the first mounting plate, wherein the first and second mounting plates are positioned under a seat mount of the frame and rearward of the pedal crank;
  a continuously variable transmission (CVT) mounted between the first and second mounting plates, and having a input configured to be coupled to the pedal crank, and an output;
  a rear wheel assembly coupled to and driven by the output of the CVT, and having an electric hub motor in a hub of a rear wheel of the rear wheel assembly; and
  wherein the CVT defines a transverse axis, the hybrid velocipede further comprises a rear suspension system including a swingarm that is mounted to the first and second mounting plates without being attached to the CVT so as to pivot about the transverse axis and which supports the rear wheel assembly.

8. The hybrid velocipede of claim 7, wherein the CVT is positioned below the seat mount.

9. The hybrid velocipede of claim 7, wherein the CVT includes a spindle that extends outwards along the transverse axis, wherein a first portion of the spindle extends through an aperture in the first mounting plate, and a second portion of the spindle extends through an aperture in the second mounting plate; and
  the swingarm comprises:
    a first arm and a second arm which each have an aperture at a main pivot portion of each arm;
    a first swingarm bearing assembly disposed in the aperture of the first arm, and a second swingarm bearing assembly disposed in the aperture of the second arm; and
    a first swingarm bushing disposed in a center of the first swingarm bearing assembly and a second swingarm bushing disposed in a center of the second swingarm bearing assembly, wherein the first and second swingarm bushings are each keyed to fit into the respective apertures of first and second mounting plates; and wherein the spindle extends through each of the first and second swingarm bushings through a keyed slot, as retained by a nut.

10. The hybrid velocipede of claim 7, wherein the hybrid pedal and electric powered vehicle is a bicycle arranged in a semi recumbent configuration.

11. A pedal driven velocipede having a split drive configuration, comprising:
  a frame including a seat mount, a front steering mount at a front of the frame, and a pedal crank mount in which a pedal crank is mounted, wherein the pedal crank mount is positioned in the frame at a semi-recumbent or recumbent arrangement;
  a left side mounting plate on a left side of the frame and a right side mounting plate on a right side of the frame opposite the left side mounting plate, wherein the left side and right side mounting plates are positioned under a seat mount of the frame and rearward of the pedal crank;
  a continuously variable transmission (CVT) mounted in and between the left side and right side mounting plates and coupled to the pedal crank via a chain or belt at a first side of the CVT, the CVT having a drive at a second side of the CVT defining a transverse axis relative to the frame;
  a swingarm that is pivotably mounted at the left side and right side mounting plates such that it pivots about the transverse axis of the CVT without being attached to the CVT, and is further coupled to the frame via a suspension component; and
  a rear wheel mounted on the swingarm that is coupled to the drive of the CVT at the second side of the CVT via a chain or belt.

12. The pedal driven velocipede of claim 11, wherein the rear wheel further comprises an electric motor in a hub of the rear wheel.

13. The pedal driven velocipede of claim 11, wherein the pedal drive velocipede is a bicycle.

14. The pedal drive velocipede of claim 11, wherein the CVT is located substantially under the seat mount.

15. The pedal driven velocipede of claim 11, wherein the frame comprises:
  a lower horizontal frame member;
  a first rear vertical frame member attached to the lower horizontal frame member and which supports the seat mount;
  a second rear vertical frame member attached to the lower horizontal frame member rearward of the first rear vertical frame member and which is further coupled to the suspension component;
  wherein the left side and right side mounting plates are attached to the frame between the first and second rear vertical frame members of a left side and a right side, respectively of the first and second frame members; and
  left and right swingarm brackets attached at the left side and right side mounting plates, respectively, and having swingarm attachment points on the transverse axis.

16. The pedal driven velocipede of claim 15, wherein the left and right swingarm brackets are each connected to the lower horizontal frame member, first rear vertical frame member, and second rear vertical frame member.

\* \* \* \* \*